(12) United States Patent
Bootland et al.

(10) Patent No.: US 12,502,653 B2
(45) Date of Patent: Dec. 23, 2025

(54) PROCESS FOR THE REMOVAL OF CARBON DIOXIDE FROM A GAS MIXTURE CONTAINING HYDROGEN

(71) Applicant: JOHNSON MATTHEY PUBLIC LIMITED COMPANY, London (GB)

(72) Inventors: Alan Bootland, Billingham (GB); David Davis, Billingham (GB); Jonathan Edgar, Billingham (GB); Jonathon Higgins, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 385 days.

(21) Appl. No.: 18/248,997

(22) PCT Filed: Dec. 3, 2021

(86) PCT No.: PCT/GB2021/053160
§ 371 (c)(1),
(2) Date: Apr. 13, 2023

(87) PCT Pub. No.: WO2022/129863
PCT Pub. Date: Jun. 23, 2022

(65) Prior Publication Data
US 2023/0390736 A1    Dec. 7, 2023

(30) Foreign Application Priority Data
Dec. 16, 2020  (GB) ..................... 2019905

(51) Int. Cl.
*B01D 53/04* (2006.01)
*B01J 20/18* (2006.01)
(Continued)

(52) U.S. Cl.
CPC ........ *B01J 20/28026* (2013.01); *B01D 53/04* (2013.01); *B01J 20/186* (2013.01);
(Continued)

(58) Field of Classification Search
CPC .. B01J 20/28026; B01J 20/186; B01J 20/265; B01J 20/28045; B01J 20/3085;
(Continued)

(56) References Cited

U.S. PATENT DOCUMENTS 6,340,382 B1 *  1/2002  Baksh ................. B01D 53/047
                                                              95/143
2001/0009125 A1  7/2001  Monereau
(Continued)

FOREIGN PATENT DOCUMENTS

EP    2145665 A2    1/2010
EP    3437731 A1    2/2019
(Continued)

OTHER PUBLICATIONS

Zhang Hemin, et al., "Structured Zeolite Monoliths with Ultrathin Framework for Fast CO 2 Adsorption Enabled by 3D Printing", Industrial & Engineering Chemistry Research, vol. 59, No. 17, Apr. 13, 2020 (Apr. 13, 2020), pp. 8223-8229, XP055895398, ISSN: 0888-5885, DOI: 10.1021/acs.iecr.9b07060; the whole document.
(Continued)

*Primary Examiner* — Frank M Lawrence, Jr.
(74) *Attorney, Agent, or Firm* — BakerHostetler

(57) ABSTRACT

A process is described for the removal of carbon dioxide from a gas mixture containing hydrogen by contacting the gas mixture with a shaped sorbent comprising a plurality of layers of photopolymerized resin containing particles of a molecular sieve carbon dioxide sorbent material.

19 Claims, 2 Drawing Sheets

Figure 1:
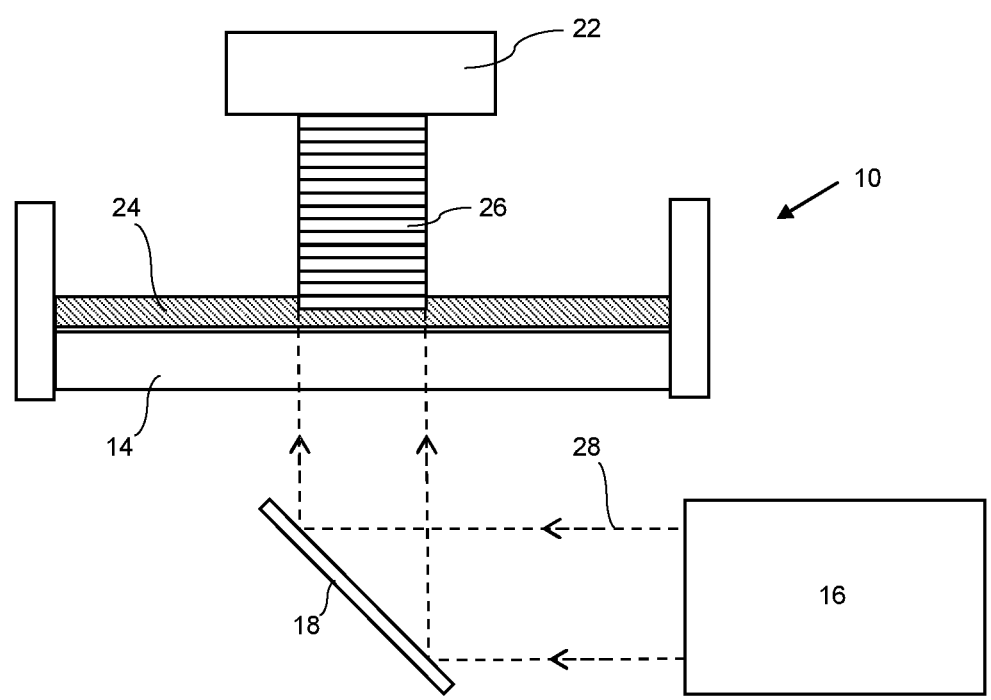

(51) Int. Cl.
  *B01J 20/26* (2006.01)
  *B01J 20/28* (2006.01)
  *B01J 20/30* (2006.01)
  *B33Y 80/00* (2015.01)

(52) U.S. Cl.
  CPC ....... *B01J 20/265* (2013.01); *B01J 20/28045* (2013.01); *B01J 20/3085* (2013.01); *B33Y 80/00* (2014.12); *B01D 2253/108* (2013.01); *B01D 2253/202* (2013.01); *B01D 2253/25* (2013.01); *B01D 2253/304* (2013.01); *B01D 2253/3425* (2013.01); *B01D 2256/16* (2013.01); *B01D 2257/504* (2013.01)

(58) Field of Classification Search
  CPC .... B01J 20/18; B01J 20/28028; B01J 20/165; B01J 20/28035; B01D 53/04; B01D 2253/108; B01D 2253/202; B01D 2253/25; B01D 2253/304; B01D 2253/3425; B01D 2256/16; B01D 2257/504; B01D 53/02; B01D 53/0462; B01D 53/0473; B01D 53/0476; B01D 53/62; B33Y 80/00; Y02C 20/40; B29C 64/10; B29C 64/124
  USPC ........ 96/154; 95/96, 139; 423/230; 502/400, 502/439, 60

See application file for complete search history.

(56) References Cited

U.S. PATENT DOCUMENTS

| | | |
|---|---|---|
| 2010/0024641 A1* | 2/2010 | Monereau ................ C01B 3/56 95/93 |
| 2016/0345731 A1 | 12/2016 | Youngs et al. |
| 2016/0354731 A1* | 12/2016 | Mochizuki ........... B01D 69/148 |
| 2018/0162052 A1 | 6/2018 | Pearlson |
| 2018/0169617 A1 | 6/2018 | Brody |
| 2019/0083954 A1 | 3/2019 | Rezaei et al. |
| 2020/0114333 A1 | 4/2020 | Campbell |
| 2020/0215480 A1* | 7/2020 | Roy ..................... B01D 71/022 |
| 2022/0016598 A1* | 1/2022 | Pang .................... B01J 20/3064 |
| 2022/0176345 A1* | 6/2022 | Bootland ............... B33Y 80/00 |
| 2023/0390736 A1* | 12/2023 | Bootland ........... B01J 20/28028 |

FOREIGN PATENT DOCUMENTS

| | | |
|---|---|---|
| WO | 2012/032325 A1 | 3/2012 |
| WO | 2016/166523 A1 | 10/2016 |
| WO | 2016/166526 A1 | 10/2016 |
| WO | 2017/003661 A1 | 1/2017 |

OTHER PUBLICATIONS

Thakkar Harshul, et al., "Development of 3D-printed polymer-zeolite composite monoliths for gas separation", Chemical Engeneering Journal, vol. 348, Sep. 1, 2018 (Sep. 1, 2018), pp. 109-116, XP055843473, Amsterdam, NL ISSN: 1385-8947, DOI: 10.1016/j.cej.2018.04.178; the whole document.
Tumblestone et al, Science, 347 (2015), pp. 1349-1352.
Gibson et al, Additive Manufacturing Technologies—Rapid prototyping to Direct Digital Manufacturing, Spring (2010), pp. 61-102.

* cited by examiner

PROCESS FOR THE REMOVAL OF CARBON DIOXIDE FROM A GAS MIXTURE CONTAINING HYDROGEN

This invention relates to shaped sorbents made by additive layer manufacture (ALM) and their use for absorption of carbon dioxide ($CO_2$) from gas mixtures.

Additive-Layer Manufacture (ALM), also known as 3-dimensional (3D) printing, is an evolving technology that offers the ability to create new shapes. WO2012/032325 discloses a method for producing a catalyst using an additive layer method comprising: (i) forming a layer of a powdered catalyst or catalyst support material, (ii) binding or fusing the powder in said layer according to a predetermined pattern, (iii) repeating (i) and (ii) layer upon layer to form a shaped unit, and (iv) optionally applying a catalytic material to said shaped unit.

The Applicants have found that photopolymerisation additive-layer manufacture surprisingly offers a means to prepare new carbon dioxide sorbents whose shape is not dictated by the conventional shaping techniques and whose efficacy for $CO_2$ absorption from gas mixtures containing hydrogen may be more readily controlled than conventional materials.

Accordingly, the invention provides a process for the removal of carbon dioxide from a gas mixture containing hydrogen by contacting the gas mixture with a shaped sorbent comprising one or more layers of photopolymerized resin containing particles of a molecular sieve carbon dioxide sorbent material.

By the term "sorbent" we include adsorbent and absorbent.

The molecular sieve carbon dioxide sorbent material may be any molecular sieve carbon dioxide sorbent material, i.e. any molecular sieve suitable for $CO_2$ adsorption.

The molecular sieve may be a zeolite material, such as a zeolite X, a zeolite Y, ZSM-5, zeolite 13X, CBV500, 3A zeolite, zeolite 4A, zeolite 5A, or a phosphate-containing molecular sieve such as an aluminium phosphate (ALPO) or silico-aluminium aluminium phosphate (SAPO), a metal-organic framework (MOF) material, such as Mg-MOF 74 or UTSA-16, or a zeolitic imidazolate framework (ZIF). The molecular sieves function at least in part by physically trapping the carbon dioxide and so removing it from the gas mixture. Zeolite 13X and zeolite 5A are preferred.

The maximum particle size (Dv100) of the molecular sieve carbon dioxide sorbent material in the shaped sorbent is preferably less than the layer thickness, more preferably less than a half the layer thickness, most preferably no less than a fifth of the layer thickness. For example, for a layer thickness of 10 μm, the maximum particle size may be in the range of 1 or 5 to 10 μm. Similarly, for a 100 μm layer thickness, the maximum particle size may be in the range 10 or 50 to 100 μm.

For layers with a thickness greater than 100 μm, the maximum particle size may be larger, but this is not necessary.

Particle sizes in the shaped sorbent may be determined using an X-ray microscope.

The shaped sorbent comprises a plurality of layers of photopolymerised resin. Each layer contains particles of a molecular sieve carbon dioxide sorbent material. The Applicant has found that, surprisingly, a molecular sieve carbon dioxide sorbent material, encapsulated within the plurality of layers of the photopolymerised resin is able to effectively capture substances in use, despite being contained within the resin.

Photopolymerisation, in general refers to the curing of liquid photo-reactive polymers (otherwise known as photopolymers) with ultraviolet or visible light or another form of electromagnetic radiation to form a photopolymerized resin. The liquid photo-reactive polymer reacts under the action of the light source, for example a UV light source, preferably having a wavelength in the range of about 375-405 nm, to form a rigid three-dimensional shape. The Applicant has found that photopolymerisation additive-layer manufacture based on photo-lithography is particularly suitable for fabricating the shaped sorbent. The most common photo-lithography-based technique is known as stereolithography (SLA) in which an ultraviolet laser is used to trace a two-dimensional image and so cure a layer of resin forming part of the desired overall shape, in a bath of liquid photopolymer. Once the trace is completed, the cured layer is immersed, for example by lowering a build platform on which the cured layer is supported, into the bath of the liquid photopolymer and then repeating the process. The process is repeated, layer-by-layer, until the desired shape has been formed. The photopolymerisation additive layer manufacturing technique generally uses a vat containing the liquid photopolymer and so the technique is sometimes referred to as vat photopolymerisation. A window may be provided in the base of the vat to allow the light source to be applied to the photopolymer from below. The laser is controlled by a computer in which the pre-determined design for the shape has been programmed. The shaped sorbent may suitably be designed using CAD-CAM software, which creates a three-dimensional computer model to be translated into the desired shape. The three-dimensional image is "cut" using the software into slices, where each slice is reconstructed through light-radiation curing of the liquid photopolymer, converting the image into a solid object. The computer and system are generally provided together as an SLA printer. SLA printers are available commercially.

A particularly suitable technique, similar to SLA, is known a digital light processing (DLP) and uses a projector to project the entire layer of the shaped sorbent through the window in the base of the reservoir onto the photopolymer rather than trace a laser beam. This reduces the time required to form the layer and allows the build platform to be raised or lowered. A non-stick layer may be provided on the window to allow removal of the shaped unit. Suitable materials include polydimethylsiloxane (PDMS) films or fluorinated ethylene polymer (FEP) films. A particularly suitable FEP film has a thickness of 0.25 m mm. A method, known as continuous liquid interface production (CLIP) or digital light synthesis (DLS), is based on DLP, but rather than physically separate the cured layer from the liquid photopolymer using a non-stick polymer, CLIP creates an oxygen-containing zone in which a thin uncured liquid layer is formed at the build point, which avoids adhesion of the shaped unit to the window. The platform may either be lowered from the cured layer, or the cured layer may be raised from the pool of liquid using a build support plate. This approach eliminates the separate steps required for the traditional SLA or DLP printer and reduces the time for fabrication of the layered structure. Descriptions of photopolymerisation processes and equipment may be found in "*Additive Manufacturing Technologies—Rapid Prototyping to Direct Digital Manufacturing*" by Ian Gibson, David W. Rosen and Brent Stucker, Spring (2010). CLIP is described in more detail by Tumblestone, et al in *Science*, 347 (2015) pages 1349-1352.

Preferably, the shaped sorbent is subjected to a post-shaping treatment to ensure complete reaction, such as placing the shaped sorbent into a UV chamber to complete the curing process.

Before use, the shaped sorbent is preferably treated to remove any adsorbed water and any adsorbed carbon dioxide. The treatment, which may also be termed activation, may include heating and/or applying a vacuum to the shaped sorbent in a suitable vessel. For example, the shaped unit may be placed in a vessel and heated to a temperature in the range 100-200° C. under an inert gas or under vacuum. The treatment may take place ex-situ in an activation vessel or in situ in the vessel in which the shaped sorbent is to be used.

The photopolymer used in the present invention may be any suitable liquid photopolymer that hardens or cures when exposed to light in the ultraviolet or visible region of the electromagnetic spectrum. Most commonly, photopolymerised systems are typically cured through UV radiation, since ultraviolet light is more energetic; however, the development of dye-based photoinitiator systems have allowed for the use of visible light, having potential advantages of processes that are safer to handle. Often, a photopolymer comprises a mixture of monomers, oligomers, and photoinitiators that form into a hardened polymeric material through a process called curing. Typically, a photopolymer comprises a mixture of multifunctional monomers and oligomers in order to achieve the desired physical properties, and therefore a wide variety of monomers and oligomers have been developed that can polymerise in the presence of light either through internal or external initiation. The properties of a photocured material, such as flexibility, adhesion, and chemical resistance are provided by the functionalized oligomers present in the photocurable composite. Oligomers are typically epoxides, urethanes, polyethers, or polyesters, each of which provide specific properties to the resulting material. Each of these oligomers are typically functionalized by an acrylate. The curing forms what is known as a network polymer. Often the photopolymer will contain a photoinitiator. Photoinitiators are compounds that upon radiation of light decompose into reactive species that activate polymerisation of specific functional groups on the oligomers. There are two general routes for photoinitiation: free radical and ionic, either of which may be used. Whereas electron-beam curing is possible for reactive oligomers and monomers without photoinitiators, this method is less preferred.

Suitable photopolymers may include acrylate oligomers, which may be used in combination with a wide variety of reactive monomers or other oligomers and photo-initiators to create the photopolymerised resins. The photopolymers should possess sufficient cross-linking and should ideally be designed to have a minimal volume shrinkage upon polymerisation in order to avoid distortion of the shaped sorbent. Common monomers utilised for imaging include multifunctional acrylates and methacrylates, often combined with a non-polymeric component in order to reduce volume shrinkage. A competing composite mixture of epoxide resins with cationic photoinitiators is becoming increasingly used since their volume shrinkage upon ring-opening polymerisation is significantly below those of acrylates and methacrylates. Free-radical and cationic polymerisations composed of both epoxide and acrylate monomers may also be used, providing the high rate of polymerisation from the acrylic monomer, and better mechanical properties from the epoxy matrix. Suitable photopolymers are available commercially.

Polymers possessing polar chemical groups along their backbone or side chains can be advantageous toward imparting $CO_2$ selective properties on the shaped sorbent. These properties, however, also tend to induce crystallisation which can be deleterious to the permeability properties of the polymer. In the current approach, dispersed solids with high selectivity for $CO_2$ adsorption are dispersed through the polymer and therefore selectivity of the polymer is not as critical. The polymer may desirably be matched to the process conditions to which the device is to be employed. Urethane-based photopolymer resin materials are preferred. For example, a urethane monomer-based formulation, Genesis Flexible Development Base Resin, available from Tethon Corporation Inc, when polymerised has rubbery/flexible properties suited to the present invention. Materials such as this tend to have good permeability properties but low selectivity. For applications with higher service temperatures, it may be required to use a resin such as HI TEMP-AMB 300 which is both formulated for VP-AM and high temperatures.

If desired, light blocking compounds, such as dyes, may be included in the sorbent mixture to alter the curing rate and assist in the shaping process.

The viscosity of the photopolymer for use in preparing the sorbent mixture and shaped sorbent is desirably in the range of 1 to 500 mPa·s at 20° C., preferably 1 to 250 mPa·s at 20° C., more preferably 1 to 100 mPa·s at 20° C.

The molecular sieve carbon dioxide sorbent material is mixed with the photopolymer to form a liquid sorbent mixture that is cured to form the shaped sorbent. Accordingly, a method for preparing a sorbent for the process includes, (i) forming a sorbent mixture comprising a photopolymer and a molecular sieve carbon dioxide sorbent material; (ii) exposing the sorbent mixture to electromagnetic radiation according to a predetermined pattern to form a layer of cured polymer; and (iii) repeating step (ii) layer upon layer to form a shaped product.

The amount of molecular sieve carbon dioxide sorbent material in the sorbent mixture and shaped sorbent as prepared may be in the range of 1 to 70% by volume. Low levels in the range of 1 to 20% by volume may be effective for capturing low levels of contaminant over extended periods. Higher levels in the range 20 to 70% by volume, preferably 25 to 70% by volume have increased capacity. Above 70% by volume, the Applicant has found the viscosity of the mixture may be too high to enable rapid formation of the layered structure.

Determination of the volume percentage may be readily achieved from the weight and density of the sorbent material.

The Applicant has found that it is desirable to reduce the viscosity of the sorbent mixture by including a dispersant in the photopolymer mixture that disperses the particles of the sorbent material and improves the processing of the shaped sorbent. The dispersant may be any suitable dispersant, including anionic dispersants, cationic dispersants and non-ionic dispersants, that do not interfere with the curing process of the photopolymer.

The Applicant has found that the temperature of the sorbent mixture may be adjusted before and during shaping to lower the viscosity. The temperature of the sorbent mixture during the shaping process is preferably in the range 20 to 90° C., more preferably 35 to 90° C., most preferably 40 to 60° C.

Other means for reducing the viscosity of the sorbent mixture may be used, for example by including a lower viscosity inert liquid that is removed after curing.

The sorbent mixture desirably has a viscosity, at the temperature it is used, in the range of 1 to 20 Pa·s, preferably 1 to 10 Pa·s.

Foaming of the polymer mixture during shaping improves permeance of structures by reducing path lengths within the shaped sorbent. The shaped sorbent is therefore preferably foamed. A foam may be produced by entrainment into a liquid containing photocurable feedstock solution through injection or mechanical agitation of a suitable gas, preferably an inert or low oxygen-content gas so as not to inhibit the photochemical reaction required to polymerise the monomers.

A stabilising agent is preferably included to stabilise the bubbles. The stabilising agent may be an emulsifier, surfactant, or dispersed particles. Industrial equipment to generate foams can be obtained from Hansa Mixer, for example. US20180162052 A1 describes the foaming of vat photopolymer 3D printing feedstocks.

The shaped sorbent comprises a plurality of layers. The number of layers in the shaped sorbent depends on the resolution of the photopolymerisation method and the size of the shaped sorbent but may, in a multi-layered structure, be in the range of 5 to 5000 or higher. The thickness of the layers in a shaped sorbent comprising a plurality of layers may be in the range 10 to 300 µm, but is preferably in the range 20 to 100 µm. SLA, DLP and CLIP techniques are particularly suitable for producing layered structures. Methods that provide concentric layers may also be used.

There is almost no limit to the geometry of the shaped sorbent that may be fabricated using the ALM technique. The shape may range from skeletal frame or multi-strut lattice structures, to multi-featured and facetted robust structures. For example, the shaped sorbent may be in the form of a wire-frame or skeletal framework structure containing a void space within and which may have multiple internal strengthening rods, or the shaped sorbent may be a honeycomb in any form or a solid unit, such as a cylinder, which may be configured with flat or domed ends, multiple lobes and/or through holes.

The shaped sorbent may comprise one or more through holes, which may be circular, elipsoid or polygonal, e.g. triangular, square, rectangular or hexagonal, in cross section. The through holes may comprise two or more through holes running parallel, or non-parallel holes running through the shaped sorbent at various angles, to the longitudinal axis of the shaped sorbent. Through holes that are curved may also be produced using the ALM technique, which is currently not possible using conventional pelleting and extrusion techniques.

The shaped sorbent desirably has a high geometric surface area to maximise the surface area for sorption. For example, the shaped sorbent may have a cylindrical or three-dimensional ellipsoidal shape comprising through-holes, for example as disclosed in WO2016/166523 and WO2016/166526.

The shaped sorbent may be prepared as a particulate material that can be used in the same manner as a conventional packed bed. Packed beds of such particulate materials generally provide a random flow path though the bed of shaped sorbent particles. The particulate material may have a cross-sectional size, either a length width or height, in the range of from 0.3 mm to 100 mm, preferably 0.3 mm to 50 mm. Alternatively, the shaped sorbent may be prepared as flow-through monoliths that may be used alone or in a connected or stacked arrangement. Flow-through monoliths typically comprise a plurality of through channels, which are often parallel, that may provide an ordered or non-random flow through the monolith. Monoliths typically have a height, width or length larger than the particulate materials, which may be in the range 10 or 15 cm to 200 cm, although suitable shaped sorbents of this type may have a height, width or length in the range of 50 to 150 cm.

The shaped sorbents are used in processes to remove carbon dioxide from gas mixtures containing hydrogen.

The gas mixture containing hydrogen may be any gas mixture that contains both carbon dioxide and hydrogen. The invention may be applied to a hydrogen gas stream containing carbon dioxide. The gas mixture containing hydrogen may be derived, for example, from electrolysis processes or from processes that convert hydrocarbon or carbonaceous fossil fuels, biomass or municipal waste to synthesis gases containing hydrogen and carbon dioxide. Synthesis gases may be generated by known methods including one or more steps of steam reforming, partial oxidation, autothermal reforming or gasification.

The synthesis gas may have been subjected to one or more stages of water-gas shift to increase its hydrogen content. The water-gas shift reaction may be depicted as follows;

$$CO + H_2O \leftrightarrow CO_2 + H_2$$

The one or more water-gas shift stages may include stages of high-temperature shift, medium-temperature shift, isothermal shift and low-temperature shift.

Following the one or more shift stages, the hydrogen-enriched gas is cooled to a temperature below the dew point so that the steam condenses. The liquid water condensate may then be separated using one or more, gas-liquid separators, which may have one or more further cooling stages between them. Any coolant may be used. One or more further stages of cooling are desirable. The cooling may be performed in heat exchange in one or more stages using demineralised water, air, or a combination of these. The cooled shifted gas may then be fed to a first gas-liquid separator, the separated gas further cooled with water and/or air and fed to a second separator, before further cooling with water and/or air and feeding to a third separator. Two or three stages of condensate separation are preferred. Some or all of the condensate may be used to generate steam for the generation of the synthesis gas, e.g. in a steam reformer.

In a preferred arrangement, the hydrogen-containing gas mixture is a synthesis gas stream comprising hydrogen and carbon dioxide having a carbon dioxide content in the range 1 to 50% by volume, preferably 10 to 30% by volume, also potentially containing water vapour, carbon monoxide and methane each in the range of 0 to 1% by volume, preferably 0 to 0.5% by volume, with the remainder of the gas mixture consisting of hydrogen. Such synthesis gases are produced in processes for the production of hydrogen that may include one or more stages of water-gas shift.

The adsorption of carbon dioxide from the gas mixture may be performed at a temperature in the range 10-200° C., preferably 10-150° C.

The adsorption of carbon dioxide from the gas mixture may be performed at a pressure from about atmospheric pressure, i.e. about 1 bar abs, up to about 100 bar abs.

The adsorption of carbon dioxide from the hydrogen-containing gas mixture may be performed in a pressure-swing adsorption (PSA), a vacuum swing adsorption (VSA) a temperature swing adsorption (TSA) process or a combination of two or more of these.

Pressure swing adsorption is widely used to separate carbon dioxide, carbon monoxide, methane and water from synthesis gas streams to produce high-purity hydrogen in refineries and petrochemical facilities. The process utilises solid adsorption materials which allow hydrogen to pass through, while trapping all larger molecules at elevated pressures. The bed is then taken offline and the captured $CO_2$ released when the operating pressure is lowered. Several adsorption beds are arranged in parallel with cyclical adsorption/desorption to allow for continuous production of hydrogen. Adsorption pressures may be in the range 10-50 bar abs.

Vacuum swing adsorption segregates certain gases from a gaseous mixture at near atmospheric pressure; the process then swings to a vacuum to regenerate the adsorbent material. VSA differs from other PSA techniques because it operates at near-ambient temperatures and pressures.

Temperature-swing adsorption (TSA) uses a similar technique to other swing adsorption techniques but cycles temperature instead of pressure. Conventional TSA processes use packed beds which can require long cycle times due to long heating and cooling requirements. To overcome these limitations, fluidised bed configurations using a particulate shaped sorbent may be used. A variant of the fluidised bed process is the SARC (swing adsorption reactor cluster) process, in which multiple fluidised bed vessels (each one consisting of several counter-current beds) are cycled through adsorption, evacuation, regeneration (by heating) and cooling.

The use of the shaped sorbents prepared using ALM offers increased effectiveness (e.g. reduced cycle time) of adsorbents in TSA/VSA/PSA setups due to the use of geometries that are tailored to process conditions and are not achievable by other technologies.

Figure 2:
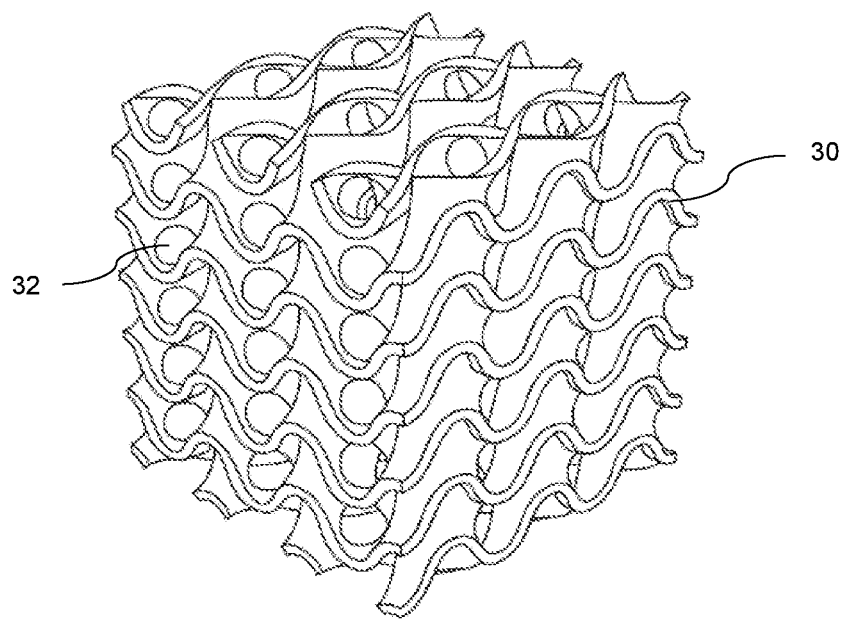
Figure 3:
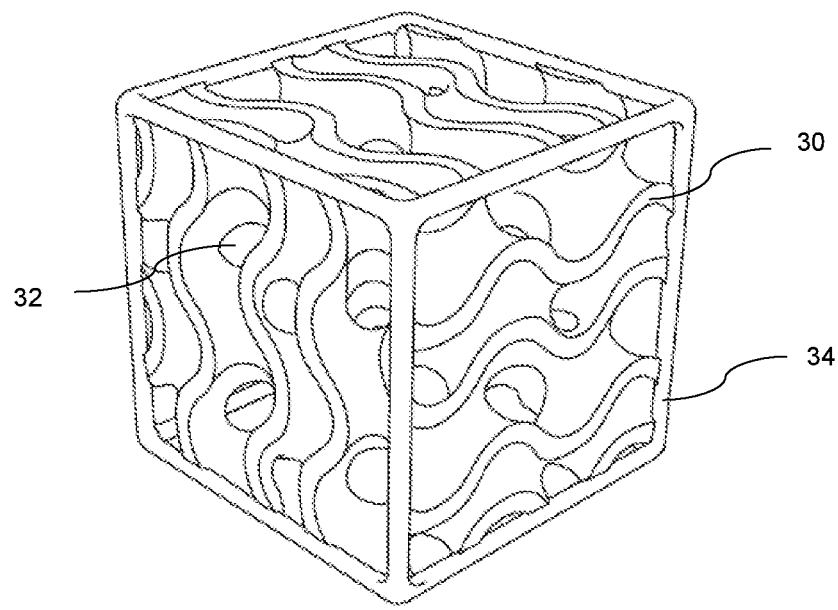

The invention will now be further described by reference to the following examples and figures in which:

FIG. 1 is a depiction of vat photopolymerisation additive-layer manufacture (VP-ALM) equipment used to prepare shaped sorbents, FIG. 2 is a depiction of a shaped unit produced for $CO_2$ adsorption using an additive layer manufacturing technique, and FIG. 3 is a depiction of another shaped unit produced for $CO_2$ adsorption using an additive layer manufacturing technique.

EXAMPLE 1. PREPARATION OF SHAPED ZEOLITE SORBENTS BY DIGITAL LIGHT PROCESSING

Materials and Equipment.

Sorbent Materials: 13X and 5A Zeolite Powder (Commercially Available).

Photopolymer: Genesis Flexible Development Base Resin is a commercially available photocurable resin that is composed of acrylated monomers/oligomers (urethane acrylate resin and urethane acrylate), dispersant, and photoinitiator. The photo-polymer viscosity at 20° C. is 45 mPa·s. This photo-polymer was supplied and used as received from Tethon Corporation Inc.

Dispersant: Hypermer KD1 is a commercially available cationic polymeric dispersant designed for creating stable solvent-based dispersions of inorganic particulates. This dispersant was supplied by Croda International Plc.

Light blocker: LB1 and 2,5-Bis(5-tert-butyl-2-benzoxazolyl)thiophene (referred to below as BBOT) are commercially available agents for preventing over-penetration of light into the photocurable resin. These agents improve feature reproduction for the designed parameters with respect to the VP-AM shaped product. LB1 was supplied by Resyner Technologies S.L. 2,5-Bis(5-tert-butyl-2-benzoxazolyl)thiophene was supplied by Alfa Aesar.

Particle size analysis: A Malvern Mastersizer 3000 with Aero S attachment was used to measure the particle size distribution of the zeolite powders with a dispersion pressure of 2 bar. 13X powder had a particle size distribution of $d_{10}$=2.7 µm, $d_{50}$=5.7 µm, $d_{90}$=11.6 µm. 5A powder had a particle size distribution of $d_{10}$=5.0 µm, $d_{50}$=11.7 µm, $d_{90}$=28.2 µm.

Computer-aided design equipment: A desktop computer running "Blender" open-source software.

Vat photo-polymerisation additive-layer manufacture (VP-ALM) equipment: Bison 1000 DLP available from Tethon Corporation Inc. The equipment is similar to that depicted in FIG. 1. The equipment comprises a computer control unit (not shown) that controls the equipment, a vat or reservoir 10 for liquid photo-polymer or adsorbent mixture having a thin, transparent polymer window 14 at its base to allow light 28 from a computer-controlled digital light processor light source 16 to be projected using a mirror 18 onto the liquid layer at the bottom of the reservoir 10. The transparent polymer window is non-stick to permit detachment of the layers of cured material. A build platform 22 may be placed in the liquid photo-polymer or adsorbent mixture 24 such that there is a layer of liquid between the lower face of the build platform 22 and the non-stick polymer window 14. Once a cured layer 26 has been formed, the platform 22 and vat 10 are separated by a layer thickness and the process repeated.

Sorbent Mixtures for Thick Sheet Preparation:

Sorbent Mixture 1: 52.1% by weight Zeolite 13X in Genesis Flexible Development Base Resin (referred to below as Base Resin).

4.60 g of Base Resin was weighed out. 5.01 g of 13X zeolite was weighed out and added to the resin within a Hauschild Speedmixer™ pot. The mixture was then mixed at 2000 rpm for 60 s. After mixing any residue of powder was returned from the sides of the container and mixed into the bulk mixture. The mixture was then mixed again at 3000 rpm for 60 s. Following this mixing procedure, the sorbent mixture was poured into the resin tank of the Bison 1000 equipment ready to produce cured material.

Sorbent Mixture 2: 50.4% by weight Zeolite 5A in Genesis Flexible Development Base Resin (referred to below as Base Resin).

4.95 g of Base Resin was weighed out. 5.04 g of 5A zeolite was weighed out and added to the resin within a Hauschild Speedmixer™ pot. The mixture was then mixed at 2000 rpm for 60 s. After mixing any residue of powder was returned from the sides of the container and mixed into the bulk mixture. The mixture was then mixed again at 3000 rpm for 60 s. Following this mixing procedure, the sorbent mixture was poured into the resin tank of the Bison 1000 equipment ready to produce cured material.

Sorbent Mixture for Thin Sheet Preparation:

Sorbent mixture 3: 58.0% by weight Zeolite 13X in 38.9% Genesis Flexible Development Base Resin (referred to below as base resin), 3.0% Hypermer KD1, and 0.1% BBOT.

0.6 g of Hypermer KD1 was weighed out and added to a Hauschild Speedmixer™ pot. 0.02 g of BBOT was weighed out and added to the dispersant. 11.6 g of 13X was weighed and added to the mixture. 7.78 g of Base Resin was weighed out and added to the pot. The pot was heated to 50° C. for 30 minutes prior to mixing. The mixture was then mixed at 3000 rpm for 120 s using a Hauschild Speedmixer™. After mixing any residue of powder was returned from the sides of the container and mixed into the bulk mixture. The mixture was then mixed again at 3000 rpm for 120 s. Following this mixing procedure, the sorbent mixture was formed into a thin sheet structure as set out below.

Sorbent Mixture 4: 54.7% by weight Zeolite 13X with 34.8% Genesis Flexible Development Base Resin (referred to below as base resin), 9.95% Hypermer KD1, and 0.5% LB1.

39.8 g of Hypermer KD1 was weighed out and added to a Hauschild Speedmixer™ pot. 2.0 g of LB1 was weighed out and added to the dispersant. 218.8 g of 13X was weighed and added to the mixture. 139.2 g of Base Resin was weighed out and added to the pot. The pot was heated to 50° C. for 60 minutes prior to mixing. The mixture was then mixed at 1400 rpm for 120 s using a Hauschild Speedmixer™. After mixing any residue of powder was returned from the sides of the container and mixed into the bulk mixture. The mixture was then mixed again at 1400 rpm for 120 s. Following this mixing procedure, the sorbent mixture was poured into the resin tank of the Bison 1000 equipment ready to produce cured material.

The zeolites 13X and 5A were not pre-conditioned and so contained adsorbed water and $CO_2$.

DLP Printer Preparation.

Methods and software are available commercially from the DLP printer providers or open-source.

The Method Used Here was as Follows:
1. Draw/Create a structure design using computer-aided design (CAD) software.
2. Import the structure design into the DLP printer equipment software for positioning on the virtual build platform and generation of automatic support structures.
3. Generate a slice file in which the design is divided up into a plurality of layers.
4. Send the slice file to the DLP printer equipment (it is necessary to ensure at this point that there is sorbent material mixture in the vat and the build platform is fixed if required).

The Genesis Flexible Development photopolymer solidifies upon exposure to 405 nm wavelength light. The Bison 1000 has a variable power light source. At the curing surface the power output is a minimum of 2.24 $mW \cdot cm^{-2}$ and a maximum of 9.05 $mW \cdot cm^{-2}$. This was calibrated for a peak wavelength of 405 nm.

Prior to forming the shaped sorbents, a working curve was determined to identify the exposure to the light source required to produce the desired resolution by exposing the photopolymer to a known amount of energy and then measuring the thickness of the solidified polymer. A description of photopolymerisation including how to determine the working curve may be found in "*Additive Manufacturing Technologies—Rapid Prototyping to Direct Digital Manufacturing*" by Ian Gibson, David W. Rosen and Brent Stucker, Spring (2010), pages 61-102.

The fully assembled reservoir was loaded with adsorbent mixture without the build platform. The pre-prepared slice file was then processed using the DLP equipment. Light was projected through the windows into the layer of liquid from the digital light processor in a pattern according to the first layer of the shaped adsorbent, thereby causing it to solidify. The light switched off after a set exposure time and the process repeated using a pattern according to a second layer of the shaped adsorbent, and so on, building up the layers until the fully-formed shaped adsorbent was realized.

The number of exposures was determined by designing an input file that, when processed by the software into slices, gave shaped adsorbents of increasing thickness depending on the corresponding number of exposures. Each exposure was 5 s at the respective power setting.

The layer thickness for each exposure is a function of the material properties of the formulation and output power of the light projector. The thickness of each area corresponding to a specific power was plotted to create a working curve.

Complex-Shape Sorbents.

Shaped sorbents comprising 55% wt zeolite 13X in the Printing Resin, prepared using this method are depicted in FIG. 2 and FIG. 3. The shaped sorbents are in the form of a triply periodic minimal surface (designated as Type #1 and Type #2 for FIG. 2 and FIG. 3, respectively). Both structures are cuboid and comprise interconnected undulating layers 30 having a plurality of through-holes 32. Type #2 has a frame 34 formed along the edges of the cube. Type #1 has outer dimensions of about 7.5 mm×7.5 mm×7.5 mm and a wall thickness of about 0.25 mm. Type #2 has outer dimensions of about 5.2 mm×5.2 mm×5.2 mm and a wall thickness of about 0.20 mm.

Thin Sheet Preparation.

A 3D Systems LC-3D Print Box (referred to below as Curing Box) was used as the UV light source to cure thin sheets of 58% 13X sorbent mixture.

An excess (1.0-2.0 g) of 58% 13X sorbent mixture was evenly deposited in a line across one end of a fluorinated ethylene polymer (referred to below as FEP) film supported by a glass pane. A 'wet' film of 58% 13X sorbent mixture was spread with 50 μm and 100 μm k-bars, respectively (commercially available from RK PrintCoat Instruments Ltd). Each of the wet films was then placed in the Curing Box for 1 minute and 3 minutes for the 50 μm and 100 μm thick films, respectively. After removal from the Curing Box, the sheets were rinsed with isopropyl alcohol and dried with compressed air. The sheets were carefully removed from the FEP film to produce cured sheets of and 60 μm for the 50 μm and 100 μm wet films, respectively.

EXAMPLE 2. $CO_2$ CAPACITY MEASUREMENTS

Single layer "thick" sheet shaped sorbents were created using Sorbent Mixtures 1 and 2 from Example 1 to characterise adsorption properties of the materials. The fully assembled reservoir was loaded with adsorbent mixture without the build platform. The pre-prepared slice file was then processed using the Bison 1000 DLP equipment. Light was projected through the windows into the layer of liquid from the digital light processor in a pattern according to the area of the shaped adsorbent, thereby causing it to solidify. The light switched off after a set exposure time of 30 s-60 s at a power of 8.33 $mW \cdot cm^{-2}$.

The shaped adsorbent was removed from the base of the reservoir and washed with isopropanol to remove unreacted sorbent mixture. The washed shaped adsorbent was then placed in a UV Curing Box and post-treated at 375-405 nm to fully cure the polymer.

Sheets of 11 cm×6 cm with thicknesses ranging between 0.15 mm and 0.25 mm were prepared by this method. Sheets were sectioned to produce small fragments to fit into a sample holder for characterisation.

Single layer "thin" sheet sorbents were created to using Sorbent Mixtures 3 from Example 1 characterise adsorption properties of the material. The adsorbent mixture was spread on a non-stick substrate with a k-bar spreader to produce 'wet' films of known thickness. The 'wet' films were placed in a Curing Box for 60-180 s and treated with 375-405 nm light.

The cured sorbent sheets were washed with isopropanol and removed from the non-stick substrate. Sheets with a final thickness of 35 μm and 60 μm were sectioned to produce smaller fragments to fit into a sample holder for characterisation Multi-layered, complex shaped sorbents (FIG. 2 and FIG. 3) were created from Sorbent Mixture 4 to characterise adsorption properties of the material. The fully assembled reservoir was loaded with adsorbent mixture with the build platform. The pre-prepared slice file was then processed using the Bison 1000 DLP equipment. Light was projected through the windows into the layer of liquid from the digital light processor in a pattern according to the area of the shaped adsorbent, thereby causing it to solidify. The first layer was exposed for 10 s at 4.1 mW·cm$^{-2}$ with subsequent layers (up to the maximum required for each respective structure) being exposed for at 4.1 mW·cm$^{-2}$. The shaped adsorbent was removed from the build platform and washed with isopropanol to remove unreacted adsorbent mixture. The washed shaped adsorbent was then placed in a UV Curing Box and post-treated at 375-405 nm to fully cure the polymer.

Tests were performed on the cured sorbent mixtures described in example 1 (50.4% by weight Zeolite 5A in Genesis Flexible Development Base Resin, 52.1% by weight Zeolite 13X in Genesis Flexible Development Base Resin, 55% Zeolite 13X in printing resin, and 58% Zeolite 13X in "thin" sheet resin mixture).

Carbon dioxide uptake of samples was measured using a Chemisorb 2480 volumetric chemisorption analyser. Accurately weighed aliquots of approximately 0.2-1 g of material were used. Activation of samples was achieved by heating under vacuum from ambient to 120° C. at 10° C. per minute, and held at this temperature for 2 hours, followed by cooling to the analysis temperature of 35° C. The sample was then held under vacuum for a further 60 minutes. The uptake of pure carbon dioxide was measured at 100, 150, 200, 300, 400, 500, 600, 700 and 760 mmHg using an equilibration time of 10 seconds to generate an equilibrium isotherm. Using the post activation sample weight, the total gas uptake was recorded at 760 mmHg. The results were as follows:

| Sample | Shape | Zeolite | Thickness (μm) | Particle Size ($d_{90}$, μm) | Solids (%) | $CO_2$/g (%) |
|---|---|---|---|---|---|---|
| Sorbent Mixture 1 | Thick Sheet | 13X | 250 | 11.6 | 52 | 3.3% |
| Sorbent Mixture 2 | Thick Sheet | 5A | 150 | 28.2 | 50 | 9.9% |
| Sorbent Mixture 3 | Thin Sheet | 13X | 35 | 11.6 | 58 | 11.7% |
| Sorbent Mixture 3 | Thin Sheet | 13X | 60 | 11.6 | 58 | 8.2% |
| Sorbent Mixture 4 | Figure 2 | 13X | 210 | 11.6 | 55 | 3.0% |
| Sorbent Mixture 4 | Figure 3 | 13X | 280 | 11.6 | 55 | 3.5% |

The results indicate that the photopolymerised samples containing 13X zeolite and 5-A zeolite are able to effectively capture carbon dioxide. The efficacy of the sorbent is improved by ensuring that the particle size embedded in the polymer is less than the layer thickness and in particular less than about $1/5^{th}$ of the thickness of the composite. Complex structures made with a DLP printer have been demonstrated (FIG. 2 and FIG. 3) and characterised to confirm uptake of $CO_2$.

The invention claimed is:

1. A process for the removal of carbon dioxide from a gas mixture containing hydrogen by contacting the gas mixture with a shaped sorbent comprising a plurality of layers of photopolymerized resin containing particles of a molecular sieve carbon dioxide sorbent material, wherein the photopolymerised resin is derived from a urethane-based photopolymer comprising a mixture of multifunctional monomers and oligomers functionalized by an acrylate.

2. The process according to claim 1, wherein the molecular sieve carbon dioxide sorbent material comprises a zeolite mat.

3. The process according to claim 1, wherein the maximum particle size (Dv100) of the molecular sieve carbon dioxide sorbent material in the shaped sorbent is less than the layer thickness.

4. The process according to claim 1, wherein the shaped sorbent comprises from 1 to 70% by volume of molecular sieve carbon dioxide sorbent material.

5. The process according to claim 1, wherein the shaped sorbent is foamed.

6. The process according to claim 1, wherein the shaped sorbent comprises 5 to 5000 layers.

7. The process according to claim 1, wherein each layer of the plurality of layers in the shaped sorbent has a thickness in the range of from 10 to 300 μm.

8. The process according to claim 1, wherein the shaped sorbent is a particulate material with a cross-sectional length, width or height, in the range of from 0.3 mm to 100 mm.

9. The process according to claim 1, wherein the shaped sorbent is a flow-through monolith with a cross-sectional length width or height, in the range of from 10 to 200 cm.

10. The process according to claim 1, wherein the gas mixture containing hydrogen is derived from an electrolysis process or from a process that converts a hydrocarbon or carbonaceous fossil fuel, biomass or municipal waste to synthesis gas containing hydrogen and carbon dioxide.

11. The process according to claim 1, wherein the hydrogen-containing gas mixture is a synthesis gas stream comprising hydrogen and carbon dioxide having a carbon dioxide content in the range 1 to 50% by volume.

12. The process according to claim 1, wherein the adsorption of carbon dioxide from the gas mixture is performed at a temperature in the range 10-200° C. and at a pressure in the range of 1 to 100 bar abs.

13. The process according to claim 1, wherein the adsorption of carbon dioxide from the hydrogen-containing gas mixture is performed in a pressure-swing adsorption (PSA) process, a vacuum swing adsorption (VSA) process, a temperature swing adsorption (TSA) process, or a combination of two or more of these.

14. The process according to claim 1, wherein the molecular sieve carbon dioxide sorbent material comprises a zeolite material selected from zeolite 13X and zeolite 5A.

15. The process according to claim 1, wherein the maximum particle size (Dv100) of the molecular sieve carbon dioxide sorbent material in the shaped sorbent is less than a half the layer thickness.

16. The process according to claim 1, wherein the maximum particle size (Dv100) of the molecular sieve carbon dioxide sorbent material in the shaped sorbent is no less than a fifth of the layer thickness.

17. The process according to claim 1, wherein each layer of the plurality of layers in the shaped sorbent has a thickness in the range of from 20 to 100 μm.

18. The process according to claim 1, wherein the shaped sorbent is a particulate material with a cross-sectional length, width or height, in the range of from 0.3 mm to 50 mm.

19. The process according to claim 1, wherein the hydrogen-containing gas mixture is a synthesis gas stream comprising hydrogen and carbon dioxide having a carbon dioxide content in the range 1 to 50% by volume, also containing water vapour, carbon monoxide and methane each in the range of 0 to 1% by volume, with the remainder of the gas mixture consisting of hydrogen.

* * * * *